United States Patent [19]

Marchbanks

[11] Patent Number: 5,544,976
[45] Date of Patent: Aug. 13, 1996

[54] PUNCTURE PROTECTION GEO MAT FOR A LANDFILL SYSTEM

[76] Inventor: Charles W. Marchbanks, 209 Asheton Way, Simpsonville, S.C. 29681

[21] Appl. No.: 176,256

[22] Filed: Jan. 3, 1994

[51] Int. Cl.⁶ .................................................... B09B 1/00
[52] U.S. Cl. .......................................... 405/129; 405/128
[58] Field of Search .............................. 405/19, 128, 129, 405/258

[56] References Cited

U.S. PATENT DOCUMENTS

| | | | |
|---|---|---|---|
| 3,252,251 | 5/1966 | Simmons | 47/29 |
| 4,219,600 | 8/1980 | Surowitz et al. | 428/255 |
| 4,815,963 | 3/1989 | Berkhout | 405/129 X |
| 5,056,960 | 10/1991 | Marienfeld | 405/128 X |
| 5,090,154 | 2/1992 | Jacob | 47/9 |
| 5,091,247 | 2/1992 | Willibey et al. | 428/255 |
| 5,137,393 | 8/1992 | Fuhr et al. | 405/129 |
| 5,258,217 | 11/1993 | Lewis | 405/129 X |
| 5,288,168 | 2/1994 | Spencer | 405/129 X |
| 5,389,166 | 2/1995 | White | 405/129 X |
| 5,401,118 | 3/1995 | Kramer | 405/129 |

*Primary Examiner*—David J. Bagnell
*Assistant Examiner*—Frederick L. Lagman
*Attorney, Agent, or Firm*—Cort Flint

[57] ABSTRACT

A landfill system and puncture protection mat which overlies a geomembrane of the landfill system are disclosed. The puncture protection mat comprises a composite mat having a geotextile fabric layer bonded to an extruded thermoplastic rubber layer. Preferably, rubber particles formed from recycled vehicle tires are compounded with a thermoplastic in the extruded layer. With the thermoplastic rubber layer contacting the geomembrane, the bonded geotextile fabric faces upward in the landfill excavation to protect the geomembrane against puncture from rocks, sticks, metal, and other solid wastes placed in the landfill.

17 Claims, 2 Drawing Sheets

Fig. 1.
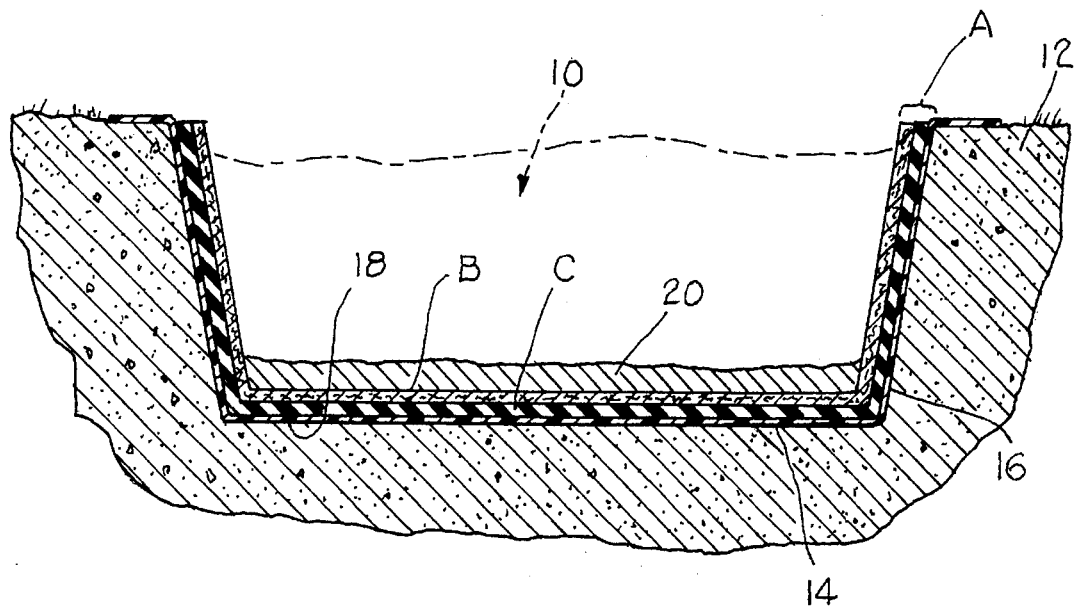
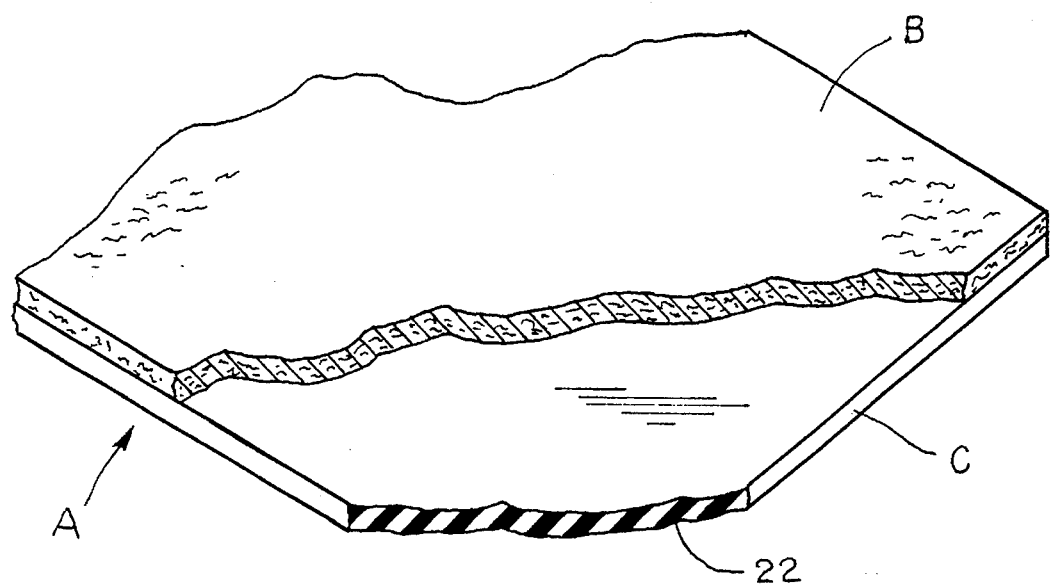
Fig. 2.

5,544,976

PUNCTURE PROTECTION GEO MAT FOR A LANDFILL SYSTEM

BACKGROUND OF THE INVENTION

The invention relates to landfill systems which include an excavation in which waste is disposed. In particular, the invention is directed to protecting a geomembrane in a landfill system by including a composite geo mat that is highly effective in resisting puncture.

Municipal landfill systems typically utilize a landfill in which solid wastes are disposed. The landfill system typically includes an excavation which is lined with a geomembrane. Sand is then placed in the bottom of the excavation on top of the geomembrane to protect against puncture from metal, rocks, wood, or other solid debris and waste placed in the excavation. Typically, three or more feet of protective cover sand is utilized in the excavation to protect against puncture of the geomembrane. While sand is utilized in the bottom of the excavation to protect against puncture, it is difficult to protect the sides of the excavation. Even though most of the weight is on the bottom of the geomembrane, it is also desirable to protect against the puncture of sides. The cost of cover sand is also expensive.

Previously, various arrangements of composite mats have been proposed for use in different applications. For example, U.S. Pat. No. 3,252,251 discloses the idea of using a geotextile mat comprising a woven fabric and a laminated plastic layer for use in a plant bed. U.S. Pat. No. 4,219,600 discloses a wood pulp, fabric layer having a plastic film backing used as a moisturizing mat. U.S. Pat. No. 5,090,154 discloses a ground cover having a polyurethane/polyethylene layer laminated with a composite layer which includes a woven fiberglass fabric filled with an asphalt filler. U.S. Pat. No. 5,091,247 discloses a woven geotextile fabric having a plastic coating for earth reinforcement applications.

It is also known to place a backing of rubber onto a cloth backing such as shown in U.S. Pat. Nos. 2,853,399 and 2,915,427. However, these applications are generally not related to landfill systems, nor puncture resistance. Chipped rubber mats have been utilized in many applications which are typically formed from a mixing chipped rubber and urethane, and molding the mixture into a product. It has also been known to form or mold a cube from shredded tire rubber and liquid urethane, and slice the material into thin layers for use as mats. However, none of the-previous prior art mats and structures are satisfactory for use in a landfill system.

Accordingly, an object of the invention is to provide a highly effective puncture protection mat for use in protecting a geomembrane in a landfill system.

Another object of the invention is to provide a composite mat which comprises a geotextile layer and an extruded thermoplastic layer bonded to the geotextile fabric formed from dispersed rubber particles.

Another object of the invention is to provide a composite mat for use in landfill systems which includes a geotextile fabric layer, and an extruded layer bonded to the geotextile layer which is extruded from a composition composed of recycled tire rubber, an extrusion agent, and a performance additive to provide a highly effective laminated mat construction having improved puncture resistant characteristic.

Another object of the invention is to provide a landfill system wherein a geomembrane lining of the landfill system is protected from puncture without the use of sand and the like by utilizing a highly effective puncture protection mat overlying the geomembrane.

SUMMARY OF THE INVENTION

The above objectives are accomplished according to the present invention by providing a composite, puncture protection geo mat for protecting a geomembrane lining overlying the excavation floor and at least a portion of the sidewalls of a landfill. The composite, puncture protection mat includes a first layer which includes a geotextile fabric and a second, extruded thermoplastic rubber layer bonded to the second layer. The extruded layer is extruded from a compound composed of rubber particles compounded with a thermoplastic polymer. A performance additive may be added for increasing the tensile strength of the geo mat. The performance additive may be any suitable compound such as an ethylene vinyl acetate. The rubber may advantageously include recycled rubber particles from vehicle tires. The recycled rubber particles are mixed with a plastic polymer to provide a resilient composite layer which resists puncture from sharp objects contained in debris placed in said landfill. The composite mat has a puncture resistance in the range of 250 to 400 pounds.

The method according to the invention includes providing a puncture protection mat in a landfill which overlies the geomembrane and includes rubber mixed with a thermoplastic polymer to resist puncture from sharp objects contained in debris placed the landfill. The method includes providing the puncture protection mat in the form of a geotextile fabric which has an extruded layer which includes a dispersion of rubber particles compounded and laminated onto the geotextile fabric. The puncture protection mat overlies the geomembrane with the geotextile fabric placed face-up. The method includes adding a performance additive to the extruded layer to enhance the tensile strength characteristics of the product. The method further includes the step of including recycled vehicle tire rubber in the extruded layer, and including one of a polypropylene and polyester fiber in the geotextile fabric. The mat is provided by extruding a thermoplastic rubber as a layer directly onto the geotextile fabric in a hot melt state for bonding.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 1 is a sectional view illustrating a landfill system incorporating a puncture protection mat according to the invention;

FIG. 2 is a perspective of a puncture protection mat according to the present invention;

DESCRIPTION OF A PREFERRED EMBODIMENT

Figure 3:
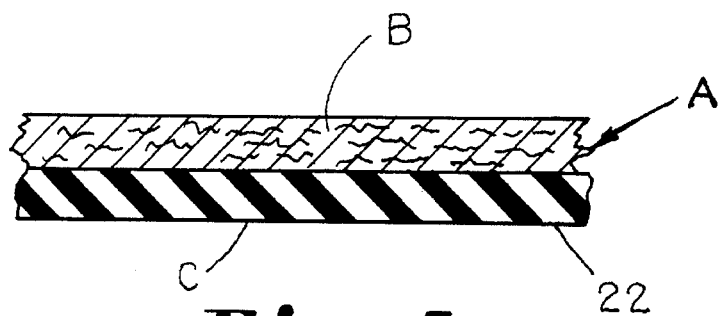
FIG. 3 is a sectional view of one form of a puncture protection mat according to the invention.

Referring now in more detail to the drawings, a landfill system and puncture protection mat according to the invention will now be described. As can best be seen in FIG. 1, a landfill excavation designated generally as 10 is formed in the earth 12, and includes a floor 14 and sidewall 16. In the typical installation, a geomembrane liner 18 overlies the floor and sidewalls of the excavation. The geomembrane lining may be provided in several conventional forms and prevents the leakage of contaminants into the earth surrounding the excavation. In accordance with the present invention, a composite, puncture protection geo mat A is included in the landfill system which overlies the geomembrane 18. A thin layer of sand 20 may be utilized to cover the floor on top of the composite mat A. Only about one foot of sand is necessary rather than three-five feet of sand as is typically utilized in landfill systems directly on top of the geomembrane.

Figure 4:
FIG. 4 is a sectional view of another embodiment of a puncture protection mat according to the invention.
Figure 5:
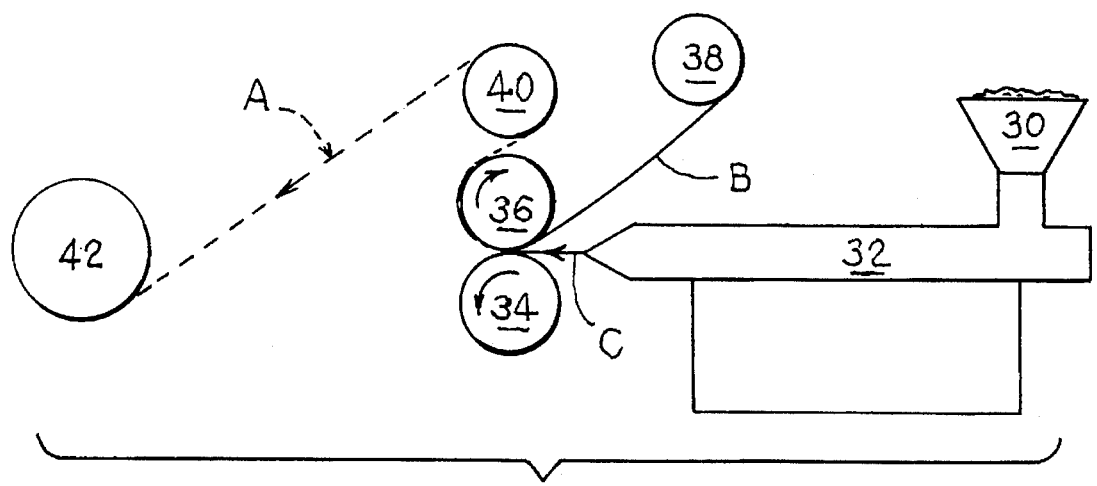
FIG. 5 is a schematic illustration of the method for making a puncture protection mat according to the invention.

As can best be seen in FIG. 2, composite geo mat A is of a laminate construction which preferably includes a first layer B which is a geotextile fabric and a second layer C which includes a thermoplastic rubber extruded onto the geotextile fabric B. Preferably, geotextile fabric B is a non-woven web of either polypropylene or polyester fibers. The textile web has a preferred weight of about 16 ounces/square yard. Other suitable polymeric materials may also be utilized. The non-woven construction is preferred for puncture resistance as there are no open spaces in a woven or braided structure. FIGS. 2 and 3 show a preferred construction in which there is laminated construction consisting of one layer of geotextile fabric B and one layer of extruded layer C. FIG. 4 illustrates an alternate embodiment in which there are two layers C of extruded rubber compound and particles for enhanced puncture resistance in those applications where additional puncture resistance is needed. However, it is anticipated that for most applications the single layer construction will be adequate. It may also be desirable to prepare the excavation by first covering the excavation floor and sides if desired, with a geo mat A, and then laying in the geomembrane lining on top of mat A. A second mat A may then be installed overlying the membrane as shown in FIG. 1. This may be advantageous for highly rocky soil.

Extruded layer C is preferably extruded from compounded rubber and a thermoplastic which acts as an extrusion agent. Any suitable thermoplastic polymer may be utilized such as polyethylene or polypropylene. Preferably, a performance additive is added to the compound to enhance tensile strength of the mat. The performance additive may be any suitable polymer such as an ethylene vinyl acetate (EVA). Preferably, the rubber consists of recycled automobile or truck tires, or other vehicle tires. It is also anticipated that virgin rubber as well as synthetic polymer and copolymer rubber and particles may also be utilized. One suitable compound for use in the extrusion of layer B is a product sold under the name Prolastomer manufactured by the Syntene Company of Seville, Ohio. Another suitable compound is disclosed in U.S. Pat. No. 5,157,082 which is incorporated by reference. While the sectional views of layer C are cross-latched using the conventional symbol for rubber, it is to be understood that layer C is actually a thermoplastic rubber layer being a rather homogeneous mixture of the thermoplastic and rubber provided by compounding the thermoplastic and recycled rubber particles dispersed in the polymer, and extruding the compound directly onto the geotextile fabric. After heating and extrusion, the rather uniformly blended thermoplastic rubber layer is formed and is fusion bonded with the fabric. Extruded layer C has an exterior surface 22 which is embossed to provide a friction surface for gripping the next adjacent surface, e.g. geomembrane 18.

The thermoplastic rubber compound laminated onto a geotextile fabric according to the invention has been found to provide a high degree of puncture resistance, and ozone resistance which are highly advantageous in the environment of a landfill system. The rubber provides resiliency and flexibility to the laminate, and provides filler body to the laminate for puncture resistance. Preferably, the composite mat has a thickness in a range of about 200–300 mils (0.200–0.300 inches), and extruded layer C has a thickness of about 30% to 60% of the total thickness, preferably 50%. The puncture protector mats according to the invention have been found to have puncture resistances ranging from 250 to 400 pounds as tested by a standard ASTM D4833 test. Other physical properties of one example of a puncture protection mat according to the invention are as follows:

| Thickness | | ASTM D1777 | 0.253 in |
|---|---|---|---|
| Unit Mass | | ASTM D37776 | 111 oz/sq. yd |
| Grab Strength | RD | ASTM D4632 | 919 lb |
| | XC | | 719 lb |
| Grab Elongation | RD | | 71% |
| | XD | | 80% |
| Tear Strength | | ASTM D4533 | 147 lb |
| | | | 134 lb |
| Low Temperature | RD | ASTM D746 | <–70 C. |
| Brittleness | XD | | <–70 C. |
| Puncture Resistance | | ASTM D4833 | |
| *probe on Geotextile | | | 350 lb |
| *probe on polymer | | | 210 lb |
| Uniaxial Tensile Properties | | ASTM D638 | |
| *Yield tension | RD | | 89 lb/in |
| | XD | | 149 lb/in |
| *Yield elongation | RD | | 62% |
| | XD | | 57% |
| *Break tension | RD | | 102 lb/in |
| | XD | | 160 lb/in |
| *Break elongation | RD | | 333% |
| | XD | | 349% |

The above composite mat has been found highly advantageous in the protection of a geomembrane lining system of a municipal landfill waste disposal system in which puncture protection is needed from rock, gravel, metal, wood, stick, and other debris commonly found in solid waste. The composite mat eliminates the 3–5 foot of cover sand normally needed in a landfill system to protect against puncture against the geomembrane and compromise of the containment system. For a twenty acre landfill, this can result in a savings of about $3,000,000 in the cost of cover sand. In use, a number of geo mats A may be welded together or overlapped in the field to sufficiently cover the geomembrane. Conventional welding techniques such as hot wedge or hot air adhesive welding may be used.

In accordance with the present invention, a composite mat for puncture protection of a geomembrane in a landfill system may be provided by utilizing the process wherein a suitable compound as described above, is fed in pellet form to a hopper 30 of a conventional extrusion machine 32. An extruded layer of the thermal plastic rubber B is fed to the nip of a pair of rollers 34 and 36 at the same time that the geotextile fabric C is fed from a supply roll 38. Both the textile fabric and the extruded layer enter the nip of the roller at the same time and are pressed together so that the extruded layer, which is still warm and in a relatively molten state, adheres to the fibers of the geotextile fabric by compression at the nip of the roller. The composite structure then travel around a directional roll 40 to a take-up roll 42 upon which the composite mat may be stored and transported. Of course other conventional processes may also be utilized to form the composite mat of the invention.

While a preferred embodiment of the invention has been described using specific terms, such description is for illustrative purposes only, and it is to be understood that changes and variations may be made without departing from the spirit or scope of the following claims.

What is claimed is:

1. A composite geo mat for overlaying and protecting a geomembrane lining in a landfill system from puncture comprising:

a first layer including geotextile fabric;

an extruded composition forming a second layer, said composition of said second layer includes rubber compounded with a thermoplastic polymer, said second layer overlaying and bonding with said first layer to form an integral composite geomat having a total thickness in the range of 200–300 mils with said second layer having a thickness of about 30% to 60% of said total thickness;

said geomat having sufficient puncture resistance to independently protect said geomembrane from puncture.

2. The mat of claim 1 wherein said second layer includes a performance additive for increasing the tensile strength of said mat.

3. The mat of claim 2 wherein said performance additive includes an ethylene vinyl acetate.

4. The mat of claim 1 wherein said rubber particles include recycled rubber particles from vehicle tires.

5. The mat of claim 1 wherein said composite mat has a puncture resistance in a range of 250 to 400 pounds.

6. A landfill system which includes an excavation having an earth floor and sidewalls comprising:

a geomembrane lining overlaying said excavation floor and at least a portion of said sidewalls;

a puncture resistant mat generally co-extending and overlying said geomembrane;

said puncture resistant mat being composed of a first layer which includes a geotextile fabric and a second layer which includes an extruded thermoplastic rubber layer, said first and said second layers being bonded together to form an integral composite puncture resistant mat having a total thickness in the range of 200–300 mils with said second layer having a thickness of about 30% to 60% of said total thickness; and said integral composite puncture resistant mat having sufficient puncture resistance to independently protect said geomembrane lining from puncture.

7. The system of claim 6 wherein said second layer is composed of rubber particles compounded with a thermoplastic polymer.

8. The system of claim 7 wherein said second layer includes a performance additive composed of an ethylene vinyl acetate.

9. The system of claim 7 wherein said rubber particles include recycled rubber particles from vehicle tires.

10. The system of claim 6 wherein said composite mat has a puncture resistance in a range of 250 to 400 pounds.

11. The system of claim 6 wherein said mat includes an embossed, exterior friction surface for fictionally engaging said geomembrane.

12. A method of protecting a geomembrane lining in a land fill system against puncture comprising:

forming a multi-layer puncture protection mat by providing a first layer comprising a textile fabric and extruding a second layer comprising a thermoplastic rubber combined with a performance additive onto said first layer;

forming said composite puncture resistant multi-layer mat to have a total thickness of about 200–300 mils with said second layer having a thickness of about 30% to 60% of said total thickness; and providing said protection against puncture by overlaying said geomembrane with said composite puncture resistant multilayer mat.

13. The method of claim 12 including providing said puncture protection mat in the form of a geotextile fabric having an extruded layer laminated onto said geotextile fabric wherein said extruded layer includes recycled rubber particles.

14. The method of claim 12 including placing said puncture protection mat overlying said geomembrane with said geotextile fabric facing up.

15. The method of claim 12 comprising the step of including recycled vehicle tire rubber in said extruded layer as dispersed rubber particles.

16. The method of claim 12 comprising including one of a polypropylene and polyester fibers in said geotextile fabric.

17. The method of claim 12 including welding a plurality of said mats together to provide a composite covering to overlie said geomembrane.

* * * * *